United States Patent
Abedini et al.

(10) Patent No.: US 11,160,041 B2
(45) Date of Patent: Oct. 26, 2021

(54) TIMING ADVANCE INDICATION

(71) Applicant: QUALCOMM Incorporated, San Diego, CA (US)

(72) Inventors: Navid Abedini, Somerset, NJ (US); Muhammad Nazmul Islam, Littleton, MA (US); Jianghong Luo, Skillman, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/407,686

(22) Filed: May 9, 2019

(65) Prior Publication Data

US 2019/0387486 A1    Dec. 19, 2019

Related U.S. Application Data

(60) Provisional application No. 62/686,520, filed on Jun. 18, 2018.

(51) Int. Cl.
*H04W 56/00* (2009.01)
*H04L 5/00* (2006.01)
*H04W 72/04* (2009.01)

(52) U.S. Cl.
CPC ......... *H04W 56/001* (2013.01); *H04L 5/0048* (2013.01); *H04W 72/0413* (2013.01)

(58) Field of Classification Search
CPC . H04L 27/2656; H04L 27/2666; H04L 5/001; H04L 5/0023; H04L 5/0048;
(Continued)

(56) References Cited

U.S. PATENT DOCUMENTS

| | | | |
|---|---|---|---|
| 6,633,559 B1 * | 10/2003 | Asokan | H04B 7/2656 370/252 |
| 2013/0142106 A1 * | 6/2013 | Zhang | H04W 56/0045 370/315 |

(Continued)

OTHER PUBLICATIONS

3GPP TSG RAN WG1 Meeting #93 ("Enhancements to support NR backhaul links", R1-1807393, dated May 2018, all pages) (Year: 2018).*

(Continued)

*Primary Examiner* — Gregory B Sefcheck
*Assistant Examiner* — Srinivasa R Reddivalam
(74) *Attorney, Agent, or Firm* — Harrity & Harrity, LLP

(57) ABSTRACT

Various aspects of the present disclosure generally relate to wireless communication. In some aspects, a first wireless node may receive, from a second wireless node, a first type of timing advance indicator, wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network. In some aspects, the first wireless node may synchronize a timing configuration of the first wireless node based at least in part on the first type of timing advance indicator. Numerous other aspects are provided.

32 Claims, 8 Drawing Sheets

600

610 — Receive, by a first wireless node and from a second wireless node, a first type of timing advance indicator, wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network 620 — Synchronize a timing configuration of the first wireless node based at least in part on the first type of timing advance indicator

(58) Field of Classification Search
CPC .............. H04L 5/008; H04W 56/001; H04W 56/0045; H04W 72/0413
See application file for complete search history.

(56) References Cited

U.S. PATENT DOCUMENTS

| | | | | |
|---|---|---|---|---|
| 2014/0355574 A1* | 12/2014 | Turtinen | ........... | H04W 72/1278 370/336 |
| 2015/0003427 A1* | 1/2015 | Wan | ................. | H04W 74/0891 370/336 |
| 2016/0174205 A1* | 6/2016 | Maaref | ................ | H04W 76/15 370/329 |
| 2017/0279577 A1* | 9/2017 | Shekalim | ............. | H04L 5/0035 |
| 2018/0132199 A1* | 5/2018 | Zhang | ............... | H04W 56/0065 |

OTHER PUBLICATIONS

International Search Report and Written Opinion—PCT/US2019/031825—ISA/EPO—dated Jul. 19, 2019.

\* cited by examiner

TIMING ADVANCE INDICATION

CROSS-REFERENCE TO RELATED APPLICATIONS UNDER 35 U.S.C. § 119

This application claims priority to U.S. Provisional Patent Application No. 62/686,520, filed on Jun. 18, 2018, entitled "TECHNIQUES AND APPARATUSES FOR TIMING ADVANCE INDICATION," which is hereby expressly incorporated by reference herein.

FIELD OF THE DISCLOSURE

Aspects of the present disclosure generally relate to wireless communication, and more particularly to techniques and apparatuses for timing advance indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first wireless node, may include receiving, from a second wireless node, a first type of timing advance indicator, wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network. The method may include synchronizing a timing configuration of the first wireless node based at least in part on the first type of timing advance indicator.

In some aspects, a first wireless node for wireless communication may include memory and one or more processors operatively coupled to the memory. The memory and the one or more processors may be configured to receive, from a second wireless node, a first type of timing advance indicator, wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network. The memory and the one or more processors may be configured to synchronize a timing configuration of the first wireless node based at least in part on the first type of timing advance indicator.

In some aspects, a non-transitory computer-readable medium may store one or more instructions for wireless communication. The one or more instructions, when executed by one or more processors of a first wireless node, may cause the one or more processors to receive, from a second wireless node, a first type of timing advance indicator, wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network. The one or more instructions, when executed by the one or more processors of the first wireless node, may cause the one or more processors to synchronize a timing configuration of the first wireless node based at least in part on the first type of timing advance indicator.

In some aspects, a first apparatus for wireless communication may include means for receiving, from a second apparatus, a first type of timing advance indicator, wherein the first type of timing advance indicator is associated with a first type of connection associated with a first group of wireless nodes, of a network, that includes the first apparatus and the second apparatus and is different from a second type of timing advance indicator used for a second type of connection associated with a second group of wireless nodes of the network. The first apparatus may include means for synchronizing a timing configuration of the first apparatus based at least in part on the first type of timing advance indicator.

Aspects generally include a method, device, apparatus, computer program product, non-transitory computer-readable medium, user equipment, base station, node, child node, parent node, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
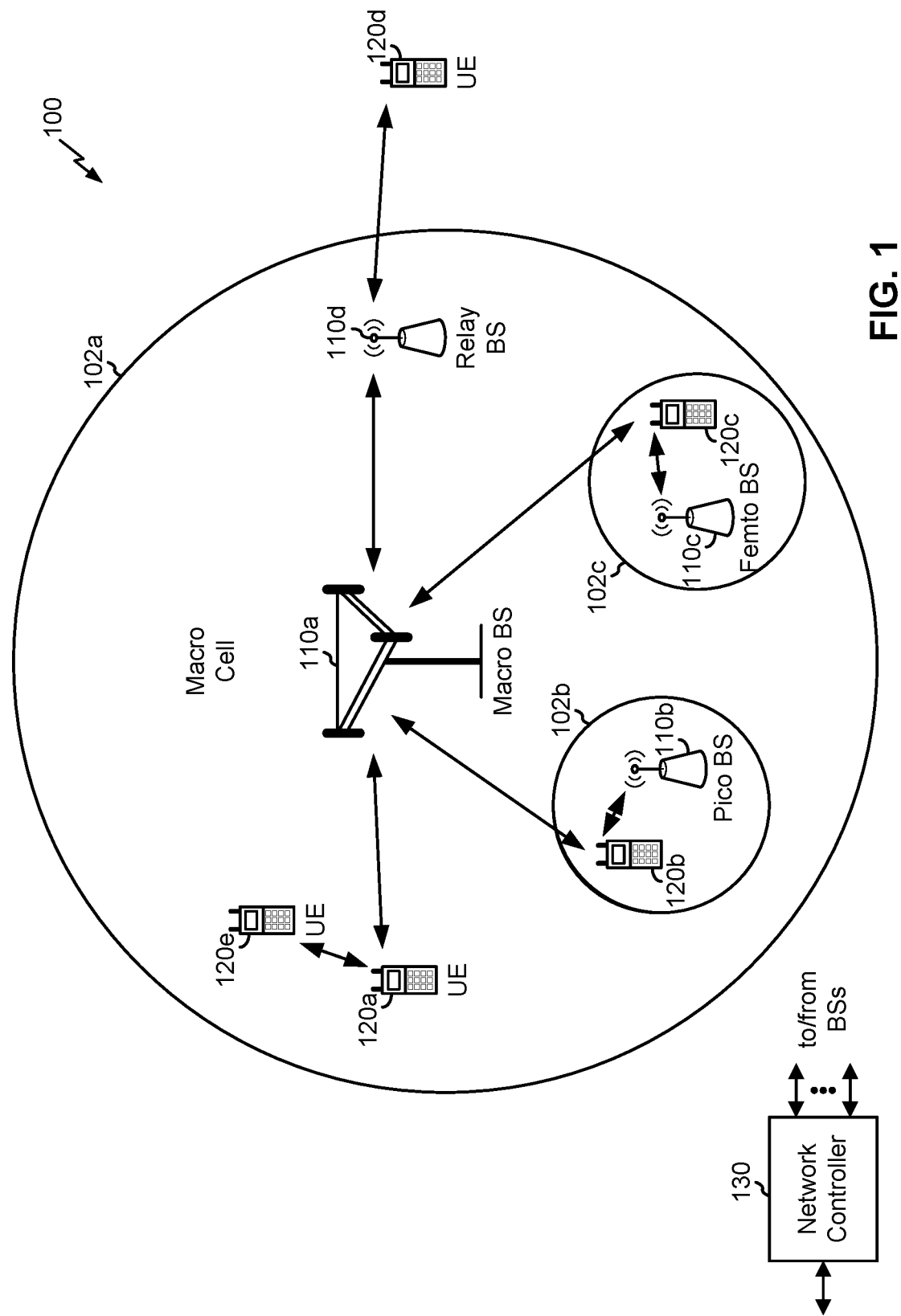
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a mobile terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
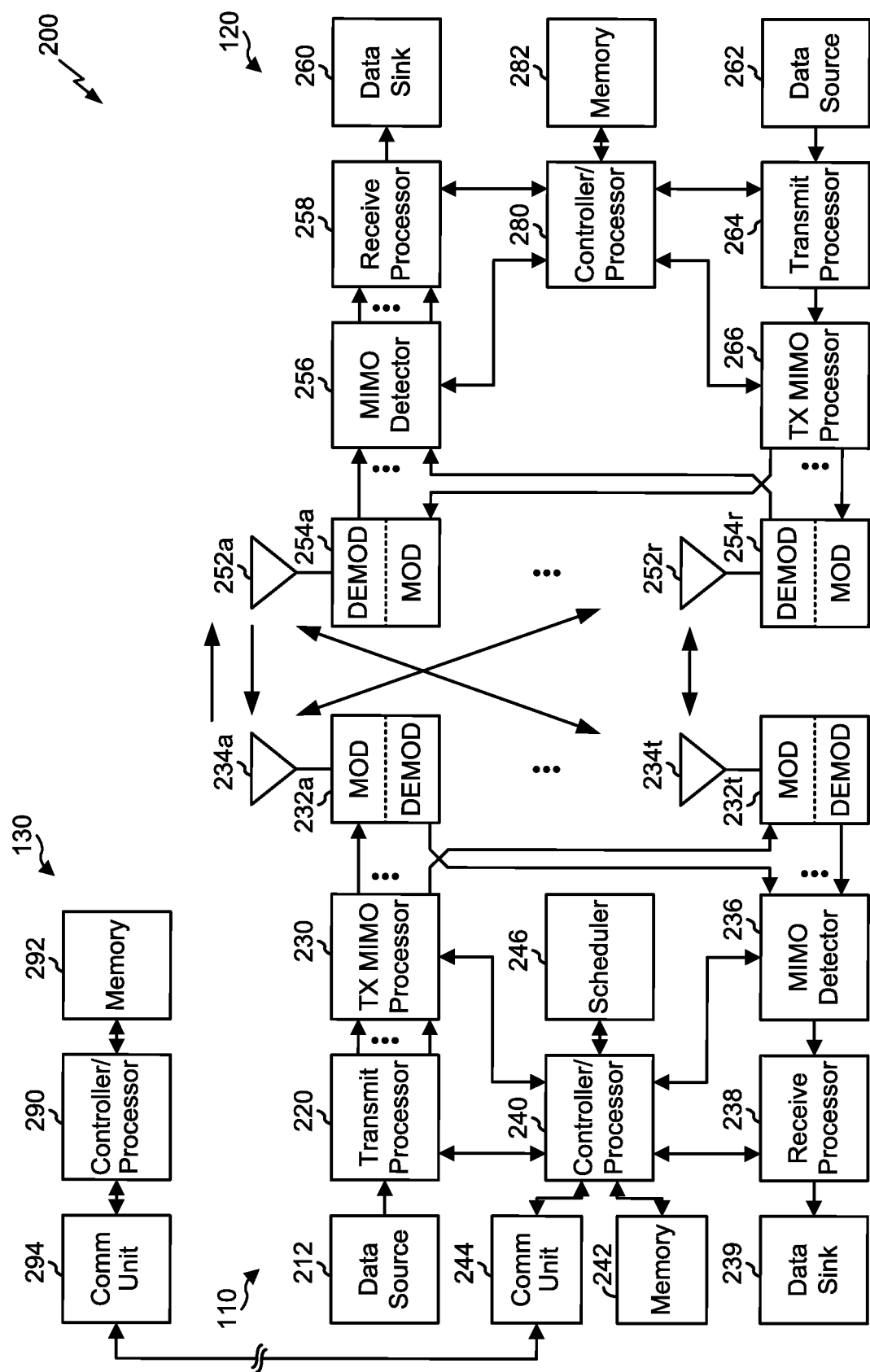
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with timing advance indication, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, a first wireless node (e.g., base station 110, UE 120, and/or the like) may include means for receiving, from a second wireless node, a first type of timing advance indicator, wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network; means for synchronizing a timing configuration of the first wireless node based at least in part on the first type of timing advance indicator; and/or the like. In some aspects, such means may include one or more components of base station 110, UE 120, and/or the like described in connection with FIG. 2.

As indicated above, FIG. 2 is provided merely as an example. Other examples may differ from what is described with regard to FIG. 2.

Figure 3A:
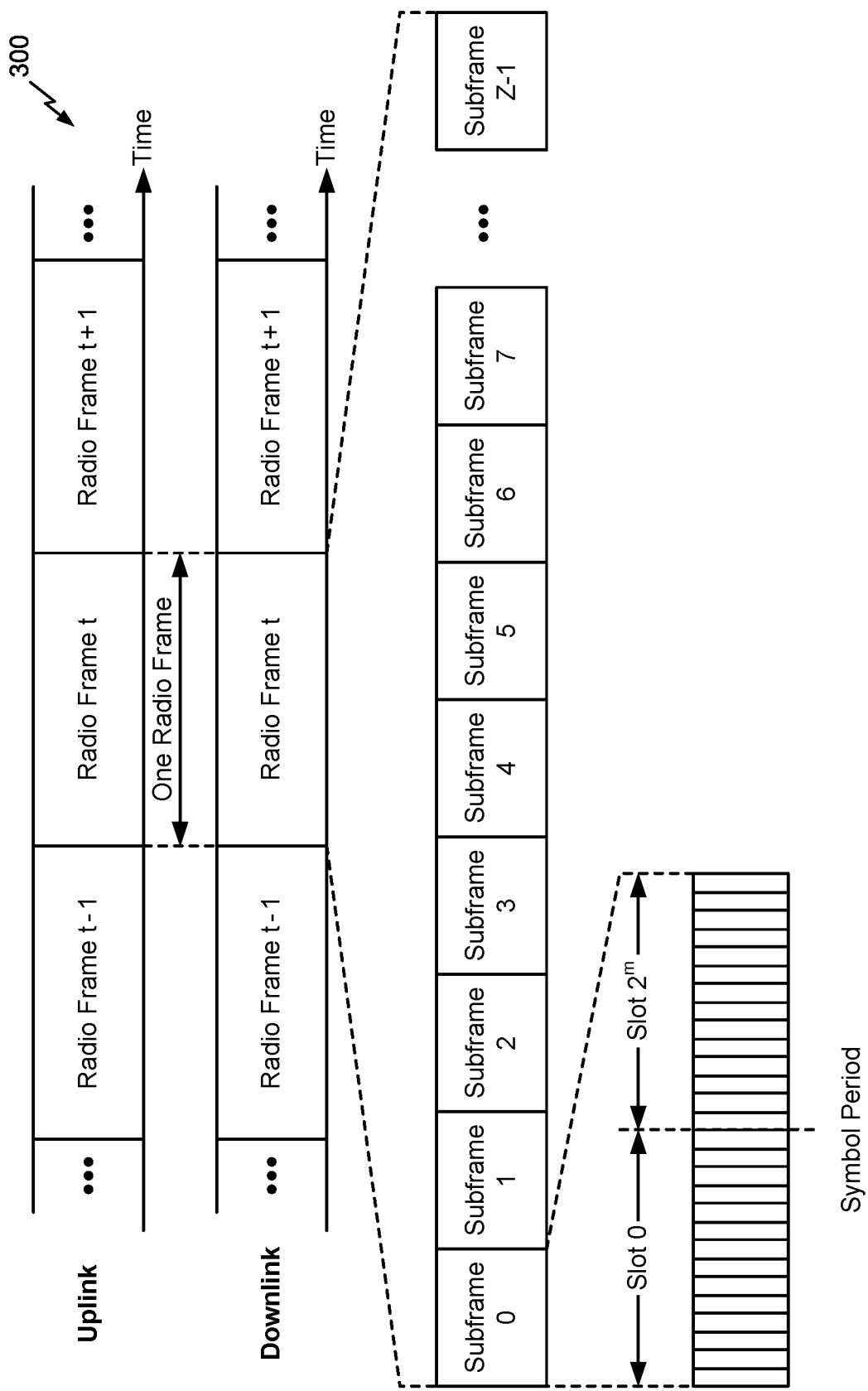
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
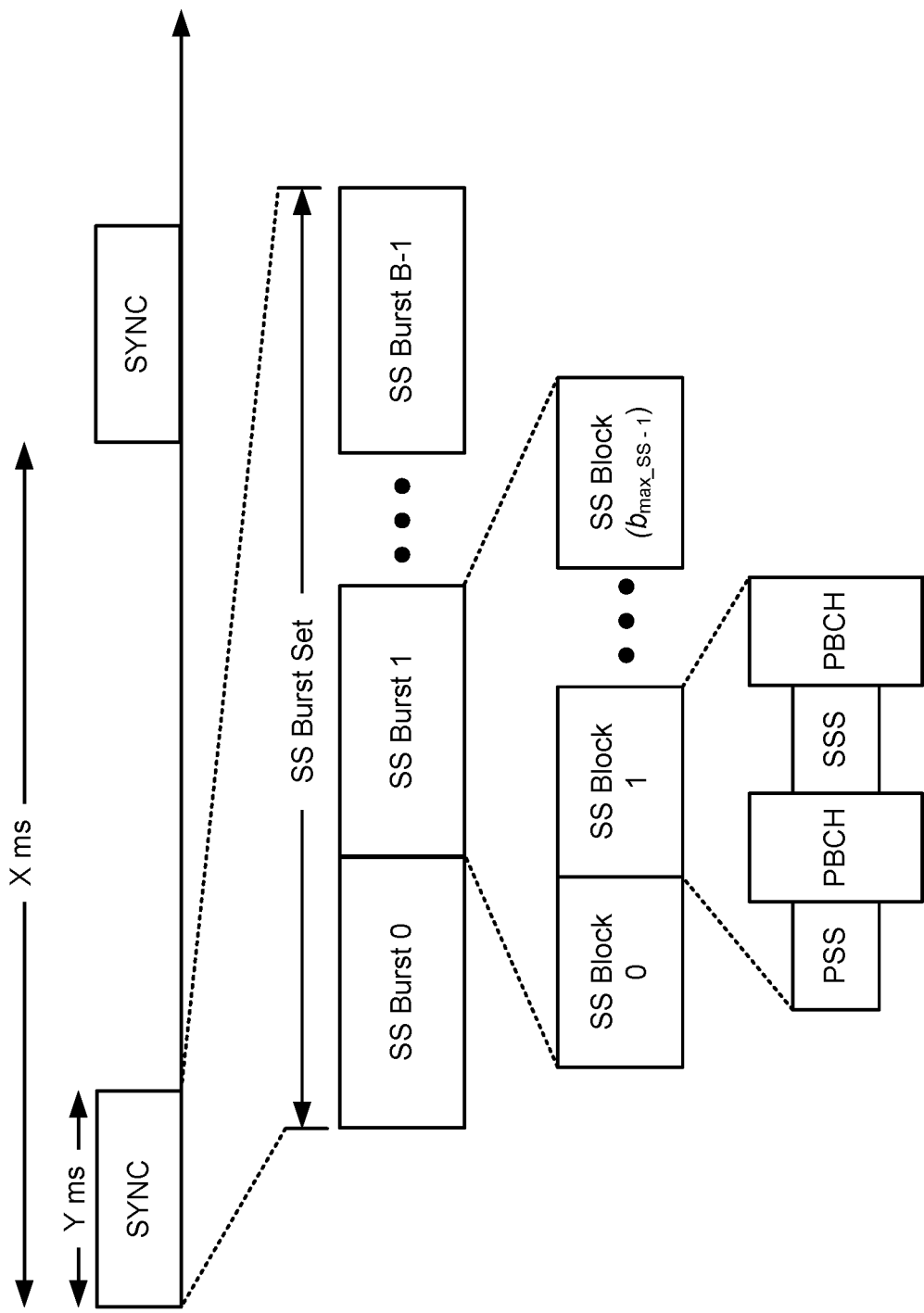
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In some communications systems, such as NR, a multi-hop network, a backhauling network, and/or the like may be deployed to enable communication between wireless nodes of the network. The wireless nodes may be associated with a timing configuration that enables alignment of communications between wireless nodes associated with different links. For example, a timing reference may be used to identify a set of communication opportunities, such as a set of slots allocated for a set of channels.

A first wireless node (e.g., a master node) may determine a timing configuration, and may provide a timing advance message, which may be termed a timing advance indicator, to identify the timing configuration to a plurality of second wireless nodes (e.g., child nodes). The plurality of second wireless nodes may use the timing advance message to align timing configurations for the plurality of second wireless nodes, and may propagate the timing configuration to hierarchically lower wireless nodes, as described in more detail herein. A quantity of hops, which may be supported by a multi-hop network, may correspond to a level of timing synchronization (e.g., an accuracy with which communication opportunities are synchronized between a set of wireless nodes).

However, using the timing advance message, which is used for access links, to propagate the timing configuration to a wireless node for a backhaul link may result in inadequate timing synchronization to support a multi-hop network. Similarly, using the timing advance message, which is used for access links, to propagate the timing configuration to wireless nodes associated with a particular device capability may result in inadequate timing synchronization to support a particular use case for the wireless nodes. For example, for backhauling in a network, a higher level of timing synchronization may be required than is supported by timing advance messages for access in the network. In this case, inadequate timing synchronization may result in inaccurate positioning determinations, less than a threshold quantity of hops being supported by the multi-hop network, and/or the like. Similarly, different types of UEs, which may be wireless nodes in the network, may be associated with different device capabilities for implementing timing advances indicated by a timing advance message. In this case, a UE may be unable to successfully implement a timing advance indicated by the timing advance message within a threshold period of time, which may result in a loss of synchronization between wireless nodes.

Some aspects may perform timing advance indication. For example, a first wireless node, of a first group of wireless nodes, may receive, from a second wireless node of the first group of wireless nodes in a network, a first type of timing advance indicator. In this case, the first type of timing advance indicator may be associated with a first type of network connection in the network, and may be different from a second type of timing advance indicator that is used by a second group of wireless nodes for a second type of network connection in the network. In this case, the first type of timing advance indicator may be a backhaul timing advance indicator for a backhaul connection in the network and the second type of timing advance indicator may be an access timing advance indicator for an access connection in the network.

In some aspects, the first type of timing advance indicator may be, relative to the second type of timing advance indicator, associated with a greater quantity of bits, a finer granularity, a tighter requirement for transmission timing error, a tighter requirement for a timing advance adjustment error, and/or the like to improve an accuracy of a timing configuration determined based at least in part on the first type of timing advance indicator. In this way, an accuracy of timing configuration is improved, synchronization of a multi-hop network is improved, positioning accuracy is improved, a quantity of hops supported by a multi-hop network is increased, and/or the like relative to using a single type of the timing advance indicator for each connection and/or type of device in a network.

Figure 4A:
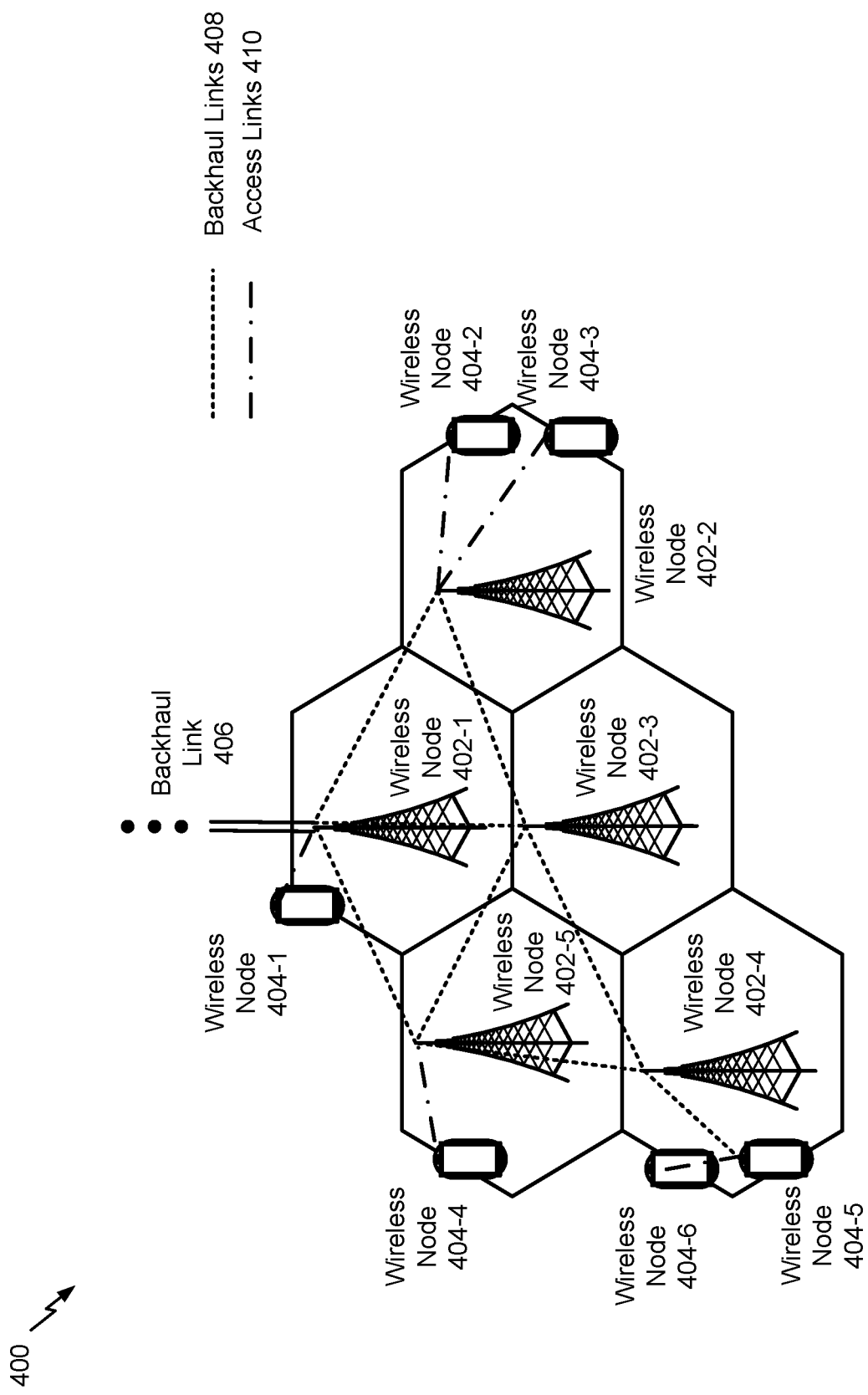
FIGS. 4A and 4B are diagrams illustrating an example of a network topology for a network, in accordance with various aspects of the present disclosure.
Figure 4B:
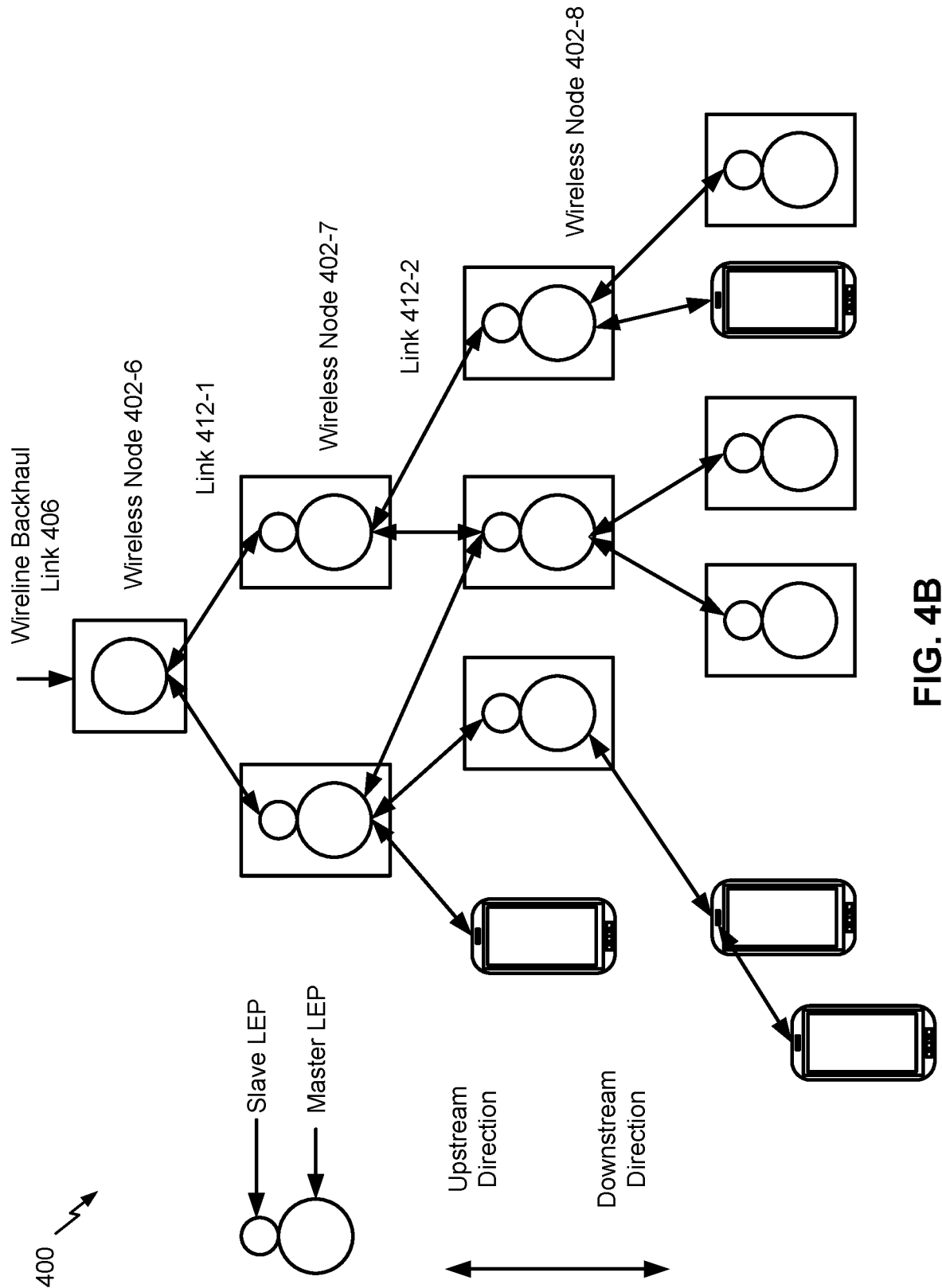

FIGS. 4A and 4B are diagrams illustrating an example 400 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., a BS 110, a UE 120, and/or the like) may communicate backhaul traffic via first mmWave resources with a second wireless node, and may communicate access traffic via second mmWave resources with a third wireless node. In some aspects, the second wireless node and the third wireless node may be the same wireless node. For example, the first wireless node may communicate traffic via first mmWave resources and second mmWave resources. Although some aspects, described herein, are described in terms of an IAB deployment, some aspects described herein may be used in connection with other types of multi-hop networks.

As shown in FIG. 4A, example 400 may include multiple wireless nodes 402 (e.g., BSs) and multiple wireless nodes 404 (e.g., UEs). At least one wireless node (e.g., wireless node 402-1) may communicate with a core network via a backhaul link 406, such as a fiber connection, a wireless backhaul connection, and/or the like. Wireless nodes 402 and 404 may communicate with each other using a set of backhaul links 408 and access links 410, such as a set of mmWave links; a 3G, 4G, 5G, etc. air interface; and/or the like. In some aspects, a wireless node 402 may correspond to BS 110 or UE 120 shown in FIG. 1. Similarly, a wireless node 404 may correspond to BS 110 or a UE 120 shown in FIG. 1.

As further shown in FIG. 4A, one or more wireless nodes 402 or 404 may communicate indirectly via one or more other wireless nodes 402 or 404. For example, data may be transferred from a core network to wireless node 404-6 via backhaul link 406, a backhaul link 408 between wireless node 402-1 and wireless node 402-5, a backhaul link 408 between wireless node 402-5 and wireless node 402-4, a backhaul link 408 between wireless node 402-4 and wireless node 404-5, and an access link 410 between wireless node 404-5 and wireless node 404-6. In some aspects, multiple different paths may be used to communicate data between wireless nodes 402 or 404. For example, wireless node 402-5 may communicate with wireless node 402-4 via a single backhaul link 408 between wireless node 402-5 and wireless node 402-4 (e.g., a direct link) and/or via a first backhaul link 408 between wireless node 402-5 and wireless node 402-3 and a second backhaul link 408 between wireless node 402-3 and wireless node 402-4 (e.g., an indirect link). In some aspects, a quantity of hops supported by a network may correspond to a maximum allowable time misalignment. For example, for a first maximum allowable time misalignment (between two wireless nodes 402 or 404), a first quantity of hops may be permissible in the network without causing excessive interference, and for a second maximum allowable time misalignment, a second quantity of hops may be permissible in the network without causing excessive interference.

As shown in FIG. 4B, wireless nodes 402 and wireless nodes 404 can be arranged in a hierarchical topology to enable management of network resources. Each link 412 (e.g., a backhaul link 408, an access link 410, or another type of link) may be associated with a master link end point (master LEP) and a slave link end point (slave LEP), which may define a hierarchy between wireless nodes 402 or 404. For example, wireless node 402-6 may communicate with wireless node 402-7 via link 412-1. In this case, wireless node 402-6 is associated with a master link end point and wireless node 402-7 is associated with a slave link end point for link 412-1, which may define wireless node 402-6 as hierarchically superior to wireless node 402-7, and wireless node 402-7 as hierarchically inferior to wireless node 402-6 with regard to link 412-1. In this case, wireless node 402-6 may be termed a master node or a parent node and wireless node 402-7 may be termed a slave node or a child node. Moreover, wireless node 402-6 may be defined as upstream relative to wireless node 402-7 (and wireless node 402-7 may be defined as downstream relative to wireless node 402-6).

Similarly, wireless node 402-7 includes a master link end point for link 412-2 and wireless node 402-8 includes a slave link end point for link 412-2. In this case, wireless node 402-7 is hierarchically superior and upstream to wireless node 402-8, and wireless node 402-8 is hierarchically inferior and downstream to wireless node 402-7 with regard to link 412-2. In this case, wireless node 402-7 may be termed the master node or the parent node and wireless node 402-8 may be termed the slave node or the child node.

As indicated above, FIGS. 4A and 4B are provided as examples. Other examples may differ from what is described with respect to FIGS. 4A and 4B.

Figure 5:
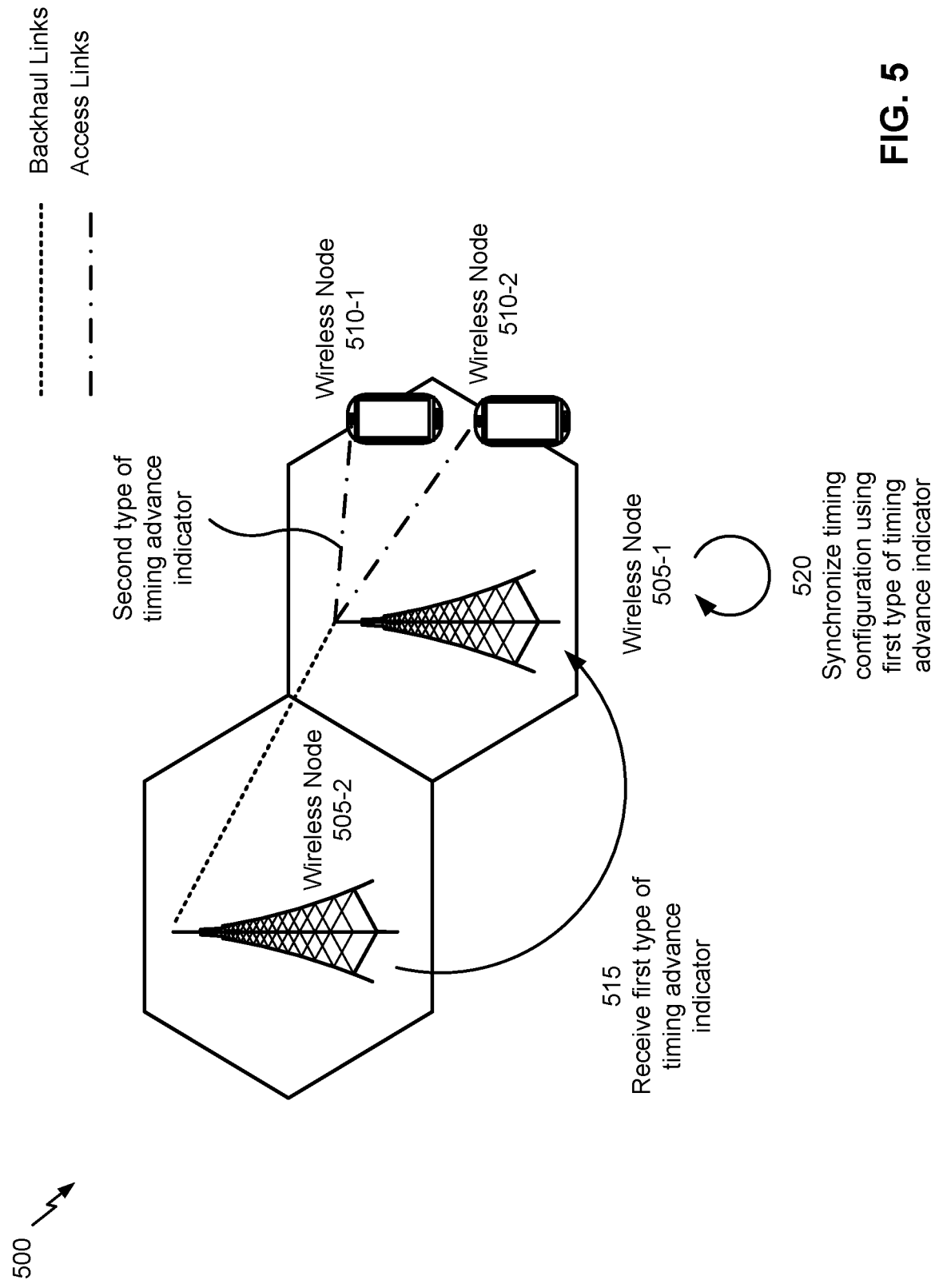
FIG. 5 is a diagram illustrating an example of timing advance indication, in accordance with various aspects of the present disclosure.

FIG. 5 is a diagram illustrating an example 500 of timing advance indication, in accordance with various aspects of the present disclosure. As shown in FIG. 5, example 500 includes a first wireless node 505-1 that is connected to a second wireless node 505-2 via a backhaul link type of connection and a set of wireless nodes 510-1 and 510-2 via an access link type of connection. Although some aspects, described herein, are described in terms of different timing advance indicators for different types of links, some aspects described herein may use different timing advance indicators for different types of wireless nodes, different network topologies, different use cases, and/or the like.

As further shown in FIG. 5, and by reference number 515, wireless node 505-1 may receive a first type of timing advance indicator. For example, based at least in part on wireless node 505-2 determining a timing configuration for a backhaul link type of connection, wireless node 505-2 may provide a timing advance indicator configured for the backhaul link type of connection. In some aspects, the first type of timing advance indicator may be different from a second type of timing advance indicator (e.g., used for an access link type of connection with wireless nodes 510 and which may be an uplink timing advance command to provide a round-trip time estimation). For example, relative to the second type of timing advance indicator, the first type of timing advance indicator may be associated with a larger quantity of bits (e.g., greater than or equal to 12 bits). In some aspects, the first type of timing advance indicator may be an offset from, for example, the second type of timing advance indicator. For example, the first type of timing advance indicator may be a round-trip time timing indicator for a backhaul link type of connection that is an offset from a timing advance indicator or timing advance command.

Additionally, or alternatively, the first type of timing advance indicator may be associated with a reduced separation time between timing advance indicators (e.g., relative to a 0.65 nanosecond periodicity for a subcarrier spacing of 120 kilohertz (kHz) for the second type of timing advance indicator). Additionally, or alternatively, the first type of timing advance indicator may be associated with a reduced threshold transmission timing error, a reduced threshold timing advance adjustment error, a reduced threshold latency for applying a timing advance indicated by the first type of timing advance indicator (e.g., less than or equal to 6 slots), and/or the like relative to the second type of timing advance indicator. Additionally, or alternatively, the first type of timing advance indicator may permit an initial timing advance value to be a negative value (e.g., indicating a timing delay that is to occur). In this way, using a timing advance indicator configured for the first type of connection enables improved timing synchronization for a multi-hop network relative to using a single type of timing advance, such as an uplink timing advance command.

In some aspects, the first type of timing advance may be determined based at least in part on a reference signal. For example, wireless node 505-1 may receive the first type of timing advance indicator in connection with an uplink reference signal, a downlink reference signal, and/or the like. In some aspects, wireless node 505-1 may request the first type of timing advance indicator (e.g., from wireless node 505-2, which may be a parent node). For example, wireless node 505-1 may receive the first type of timing advance indicator as a response to a request for the first type of timing advance indicator provided via a random access channel (RACH) message, a contention free RACH (CFRA) message, a media access control (MAC) control element (CE) of a physical uplink shared channel (PUSCH), a radio resource control (RRC) message, or another type of upper-layer message.

In some aspects, wireless node 505-1 may perform an access procedure before receiving the first type of timing advance indicator. For example, wireless node 505-1 may perform an initial access procedure and may receive the second type of timing advance indicator. In this case, after the initial access procedure, wireless node 505-1 may provide information indicating that wireless node 505-1 is configured to use the first type of timing advance indicator (e.g., indicating that wireless node 505-1 is connected for a backhaul link), and may receive the first type of timing advance indicator to enable wireless node 505-1 to configure timing based at least in part on the first type of timing advance indicator. In some aspects, wireless node 505-1 may indicate that wireless node 505-1 is configured to use the first type of timing advance indicator concurrent with the initial access procedure, and may receive the first type of timing advance indicator rather than the second type of timing advance indicator.

As further shown in FIG. 5, and by reference number 520, wireless node 505-1 may synchronize a timing configuration using the first type of timing advance indicator. For example, wireless node 505-1 may set a reference time for transmitting and/or receiving via the backhaul link type of connection based at least in part on the timing advance indicator. Additionally, or alternatively, wireless node 505-1 may determine a round-trip time estimate corresponding to a propagation delay associated with the backhaul link with wireless node 505-2. In this way, wireless node 505-1 may enable communication (e.g., uplink communication and/or downlink communication) with wireless node 505-2, and may propagate the timing configuration to enable communication with other wireless nodes (e.g., wireless nodes 510).

In some aspects, wireless node 505-1 may determine the timing configuration for transmitting and/or receiving based at least in part on a mobility state of a wireless node 505 (e.g., wireless node 505-1, wireless node 505-2, and/or the like), a topological state of a network including wireless nodes 505, a scheduling state of a wireless node 505, a set of allocated resources for a wireless node 505, a quantity of nodes in a group of wireless nodes 505, a capability of a wireless node 505, and/or the like. For example, a first type of timing advance indicator with a first timing configuration may be used for a first type of link defined by a first device capability of a wireless node 505 connected to wireless node 505-1. In this case, the second type of timing advance indicator may be used for a connection with another wireless node 505 with a second device capability.

In some aspects, wireless node 505-1 may provide a report identifying a downlink reception timing (e.g., to wireless node 505-2, wireless nodes 510, and/or another wireless node). For example, based at least in part on determining a change to a downlink reception timing, wireless node 505-1 may provide the report to identify a round-trip time estimate. In this way, wireless node 505-1 improves an accuracy of time synchronization relative to implicitly signaling a round-trip time estimate by updating an uplink transmission timing. In some aspects, wireless node 505-1 may detect the change to the downlink reception timing based at least in part on monitoring a wideband downlink signal and/or a wideband downlink channel. In some aspects, wireless node 505-1 may detect the change to the downlink reception timing based at least in part on a change to the round-trip time estimate, based at least in part on receiving a round-trip time estimate, and/or the like.

In some aspects, wireless node 505-1 may provide the report of the round-trip time estimate using a MAC CE, an aperiodic report, a periodic report, and/or the like. In some aspects, wireless node 505-1 may provide the report of the round-trip time estimate based at least in part on receiving a request from, for example, wireless node 505-2. For example, wireless node 505-2 may signal to wireless node 505-1 that wireless node 505-1 is to provide a report of the round-trip time estimate rather than implicitly signaling by changing an uplink transmission timing.

As indicated above, FIG. 5 is provided as an example. Other examples may differ from what is described with respect to FIG. 5.

Figure 6:
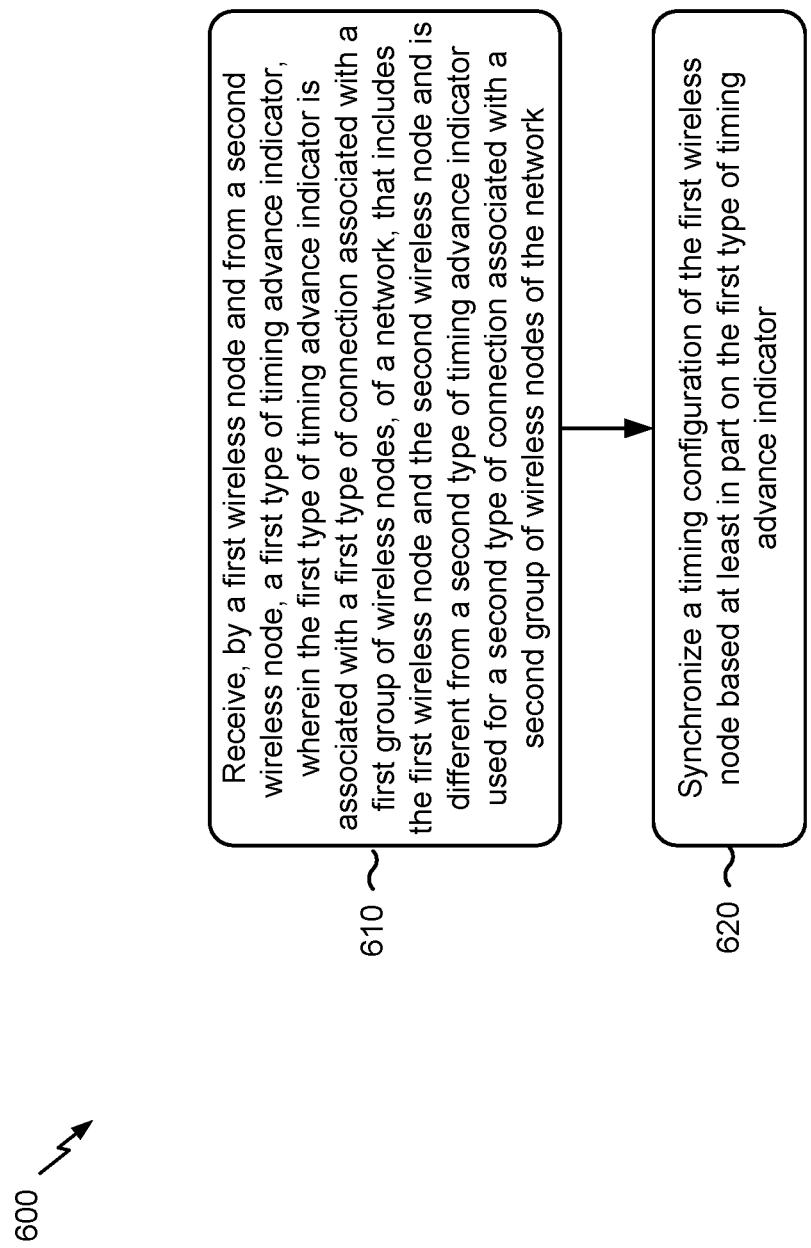
FIG. 6 is a diagram illustrating an example process performed, for example, by a wireless node, in accordance with various aspects of the present disclosure.

FIG. 6 is a diagram illustrating an example process 600 performed, for example, by a wireless node, in accordance with various aspects of the present disclosure. Example process 600 is an example where a first wireless node (e.g., BS 110, UE 120, and/or the like) performs timing advance indication.

As shown in FIG. 6, in some aspects, process 600 may include receiving, by a first wireless node and from a second wireless node, a first type of timing advance indicator, wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network (block 610). For example, the first wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, from the second wireless node, the first type of timing advance indicator. In some aspects, the first type of timing advance indicator is associated with the first type of connection associated with the first group of wireless nodes, of the network, that includes the first wireless node and the second wireless node and is different from the second type of timing advance indicator used for the second type of connection associated with the second group of wireless nodes of the network.

As shown in FIG. 6, in some aspects, process 600 may include synchronizing a timing configuration of the first wireless node based at least in part on the first type of timing advance indicator (block 620). For example, the first wireless node (e.g., using controller/processor 240, controller/processor 280, and/or the like) may synchronize the timing configuration of the first wireless node based at least in part on the first type of timing advance indicator.

Process 600 may include additional aspects, such as any single aspect or any combination of aspects described below and/or in connection with one or more other processes described elsewhere herein.

In a first aspect, the first type of timing advance indicator is a backhaul timing advance indicator and the first type of connection is a backhaul connection, and the second type of timing advance indicator is an access timing advance indicator and the second type of connection is an access connection. In a second aspect, alone or in combination with the first aspect, the first type of connection is associated with a first timing characteristic and the second type of connection is associated with a second timing characteristic that is different from the first timing characteristic. In a third aspect, alone or in combination with any one or more of the first and second aspects, relative to the second type of timing advance indicator, the first type of timing advance indicator is associated with at least one of a greater quantity of bits, a reduced separation time between timing advance indicators, a reduced threshold transmission timing error, a reduced threshold timing advance error, a reduced threshold for applying a timing advance indicated by the first type of timing advance indicator, and/or the like. In a fourth aspect, alone or in combination with any one or more of the first through third aspects, the first type of timing advance indicator includes a negative initial value indicating a timing delay.

In a fifth aspect, alone or in combination with any one or more of the first through fourth aspects, the first type of timing advance indicator is received in connection with an uplink reference signal or a downlink reference signal transmitted by the first wireless node. In a sixth aspect, alone or in combination with any one or more of the first through fifth aspects, the first wireless node is configured to receive the first type of timing advance indicator in connection with a request for the first type of timing advance indicator and using at least one of a random access channel message, a contention free random access channel message, a physical uplink control channel, a media access control control element of a physical uplink shared channel, a radio resource control (RRC) message, an upper-layer message, and/or the like. In a seventh aspect, alone or in combination with any one or more of the first through sixth aspects, the timing configuration is determined based at least in part on at least one of a mobility state of at least one of the first group of wireless nodes, a topological state of at least one of the first group of wireless nodes, a scheduling state of at least one of the first group of wireless nodes, allocated resources of at least one of the first group of wireless nodes, a quantity of nodes in the first group of wireless nodes, a capability of at least one of the first group of wireless nodes, and/or the like. In an eighth aspect, alone or in combination with any one or more of the first through seventh aspects, the first wireless node is configured to provide an indication identifying the first wireless node after performing an initial access for the network, and the first wireless node is configured to synchronize the timing configuration after providing the indication identifying the first wireless node.

In a ninth aspect, alone or in combination with any one or more of the first through eighth aspects, the first wireless node is configured to provide an indication identifying the first wireless node concurrent with performing an initial access, and the first wireless node is configured to synchronize a plurality of timing configurations based at least in part on the first type of timing advance indicator. In a tenth aspect, alone or in combination with any one or more of the first through ninth aspects, the first wireless node is configured to determine a round-trip time estimation based at least in part on a downlink reference signal. In an eleventh aspect, alone or in combination with any one or more of the first through tenth aspects, the downlink reference signal is a wideband downlink reference signal or is associated with a threshold periodicity.

In a twelfth aspect, alone or in combination with any one or more of the first through eleventh aspects, the first wireless node is configured to report the round-trip time estimation to the second wireless node to enable the second wireless node to configure another timing configuration of the second wireless node. In a thirteenth aspect, alone or in combination with any one or more of the first through twelfth aspects, a report of the round-trip timing estimation is a media access control control element message. In a fourteenth aspect, alone or in combination with any one or more of the first through thirteenth aspects, a report of the round-trip timing estimation is provided in connection with a request from the second wireless node. In a fifteenth aspect, alone or in combination with any one or more of the first through fourteenth aspects, a report of the round-trip timing estimation is an aperiodic report. In a sixteenth aspect, alone or in combination with any one or more of the first through fifteenth aspects, a report of the round-trip timing estimation is a periodic report. In a seventeenth aspect, alone or in combination with any one or more of the first through sixteenth aspects, a report of the round-trip timing estimation is provided in connection with an explicit indication or an implicit indication. In an eighteenth aspect, alone or in combination with any one or more of the first through seventeenth aspects, a first type of timing advance indicator is an offset from a timing advance indication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first wireless node, comprising:
  receiving, from a second wireless node, a first type of timing advance indicator,
    wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network,
    wherein, relative to the second type of timing advance indicator, the first type of timing advance indicator is associated with a reduced periodicity, and
    wherein the second type of timing advance indicator is associated with a 0.65 nanosecond periodicity for a subcarrier spacing of 120 kilohertz (kHz); and
  synchronizing a timing configuration of the first wireless node based at least in part on the first type of timing advance indicator.

2. The method of claim 1, wherein the first type of timing advance indicator is a backhaul timing advance indicator and the first type of connection is a backhaul connection, and
  wherein the second type of timing advance indicator is an access timing advance indicator and the second type of connection is an access connection.

3. The method of claim 1, wherein the first type of connection is associated with a first timing characteristic and the second type of connection is associated with a second timing characteristic that is different from the first timing characteristic.

4. The method of claim 1, wherein, relative to the second type of timing advance indicator, the first type of timing advance indicator is further associated with at least one of:
  a greater quantity of bits,
  a reduced threshold transmission timing error,
  a reduced threshold timing advance error, or
  a reduced threshold for applying a timing advance indicated by the first type of timing advance indicator.

5. The method of claim 1, wherein the first type of timing advance indicator includes a negative initial value indicating a timing delay.

6. The method of claim 1, wherein the first type of timing advance indicator is received in connection with an uplink reference signal or a downlink reference signal transmitted by the first wireless node.

7. The method of claim 1, wherein the first wireless node is configured to receive the first type of timing advance indicator in connection with a request for the first type of timing advance indicator and using at least one of:
  a random access channel message,
  a contention free random access channel message,
  a physical uplink control channel,
  a media access control control element of a physical uplink shared channel,
  a radio resource control (RRC) message, or
  an upper-layer message.

8. The method of claim 1, wherein the timing configuration is determined based at least in part on at least one of:
  a mobility state of at least one of the first group of wireless nodes,
  a topological state of at least one of the first group of wireless nodes,
  a scheduling state of at least one of the first group of wireless nodes,
  allocated resources of at least one of the first group of wireless nodes,
  a quantity of nodes in the first group of wireless nodes, or
  a capability of at least one of the first group of wireless nodes.

9. The method of claim 1, wherein the first wireless node is configured to provide an indication identifying the first wireless node after performing an initial access for the network, and
  wherein the first wireless node is configured to synchronize the timing configuration after providing the indication identifying the first wireless node.

10. The method of claim 1, wherein the first wireless node is configured to provide an indication identifying the first wireless node concurrent with performing an initial access, and
  wherein the first wireless node is configured to synchronize a plurality of timing configurations based at least in part on the first type of timing advance indicator.

11. The method of claim 1, wherein the first wireless node is configured to determine a round-trip time estimation based at least in part on a downlink reference signal.

12. The method of claim 11, wherein the downlink reference signal is a wideband downlink reference signal or is associated with a threshold periodicity.

13. The method of claim 11, wherein the first wireless node is configured to report the round-trip time estimation to the second wireless node to enable the second wireless node to configure another timing configuration of the second wireless node.

14. The method of claim 13, wherein a report of the round-trip timing estimation is a media access control control element message.

15. The method of claim 13, wherein a report of the round-trip timing estimation is provided in connection with a request from the second wireless node.

16. The method of claim 13, wherein a report of the round-trip timing estimation is an aperiodic report.

17. The method of claim 13, wherein a report of the round-trip timing estimation is a periodic report.

18. The method of claim 13, wherein a report of the round-trip timing estimation is provided in connection with an explicit indication or an implicit indication.

19. The method of claim 1, wherein the first type of timing advance indicator is an offset from a timing advance indication.

20. The method of claim 1, wherein the reduced periodicity is for the subcarrier spacing.

21. A first wireless node for wireless communication, comprising:
a memory; and
one or more processors operatively coupled to the memory, the memory and the one or more processors configured to:
receive, from a second wireless node, a first type of timing advance indicator,
wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network,
wherein, relative to the second type of timing advance indicator, the first type of timing advance indicator is associated with a reduced periodicity, and
wherein the second type of timing advance indicator is associated with a 0.65 nanosecond periodicity for a subcarrier spacing of 120 kilohertz (kHz); and
synchronize a timing configuration of the first wireless node based at least in part on the first type of timing advance indicator.

22. The first wireless node of claim 21, wherein the first type of timing advance indicator is a backhaul timing advance indicator and the first type of connection is a backhaul connection, and
wherein the second type of timing advance indicator is an access timing advance indicator and the second type of connection is an access connection.

23. The first wireless node of claim 21, wherein the first type of connection is associated with a first timing characteristic and the second type of connection is associated with a second timing characteristic that is different from the first timing characteristic.

24. The first wireless node of claim 21, wherein, relative to the second type of timing advance indicator, the first type of timing advance indicator is further associated with at least one of:
a greater quantity of bits,
a reduced threshold transmission timing error,
a reduced threshold timing advance error, or
a reduced threshold for applying a timing advance indicated by the first type of timing advance indicator.

25. The first wireless node of claim 21, wherein the reduced periodicity is for the subcarrier spacing.

26. A non-transitory computer-readable medium storing one or more instructions for wireless communication, the one or more instructions comprising:
one or more instructions that, when executed by one or more processors of a first wireless node, cause the one or more processors to:
receive, from a second wireless node, a first type of timing advance indicator,
wherein the first type of timing advance indicator is associated with a first type of connection associated with a first group of wireless nodes, of a network, that includes the first wireless node and the second wireless node and is different from a second type of timing advance indicator used for a second type of connection associated with a second group of wireless nodes of the network,
wherein, relative to the second type of timing advance indicator, the first type of timing advance indicator is associated with a reduced periodicity, and
wherein the second type of timing advance indicator is associated with a 0.65 nanosecond periodicity for a subcarrier spacing of 120 kilohertz (kHz); and
synchronize a timing configuration of the first wireless node based at least in part on the first type of timing advance indicator.

27. The non-transitory computer-readable medium of claim 26, wherein the first type of timing advance indicator is a backhaul timing advance indicator and the first type of connection is a backhaul connection, and
wherein the second type of timing advance indicator is an access timing advance indicator and the second type of connection is an access connection.

28. The non-transitory computer-readable medium of claim 26, wherein the first type of connection is associated with a first timing characteristic and the second type of connection is associated with a second timing characteristic that is different from the first timing characteristic.

29. The non-transitory computer-readable medium of claim 26, wherein, relative to the second type of timing advance indicator, the first type of timing advance indicator is further associated with at least one of:
a greater quantity of bits,
a reduced threshold transmission timing error,
a reduced threshold timing advance error, or
a reduced threshold for applying a timing advance indicated by the first type of timing advance indicator.

30. A first apparatus for wireless communication, comprising:
means for receiving, from a second apparatus, a first type of timing advance indicator,
wherein the first type of timing advance indicator is associated with a first type of connection associated with a first group, of a network, that includes the first apparatus and the second apparatus and is different from a second type of timing advance indicator used for a second type of connection associated with a second group of the network,
wherein, relative to the second type of timing advance indicator, the first type of timing advance indicator is associated with a reduced periodicity, and wherein the second type of timing advance indicator is associated with a 0.65 nanosecond periodicity for a subcarrier spacing of 120 kilohertz (kHz); and means for synchronizing a timing configuration of the first apparatus based at least in part on the first type of timing advance indicator.

31. The first apparatus of claim 30, wherein the first type of timing advance indicator is a backhaul timing advance indicator and the first type of connection is a backhaul connection, and wherein the second type of timing advance indicator is an access timing advance indicator and the second type of connection is an access connection.

32. The first apparatus of claim 30, wherein the first type of connection is associated with a first timing characteristic and the second type of connection is associated with a second timing characteristic that is different from the first timing characteristic.

\* \* \* \* \*